May 28, 1929.　　　J. SHELLEY　　　1,715,309
COTTON PICKER
Filed Dec. 30, 1926　　　4 Sheets-Sheet 1
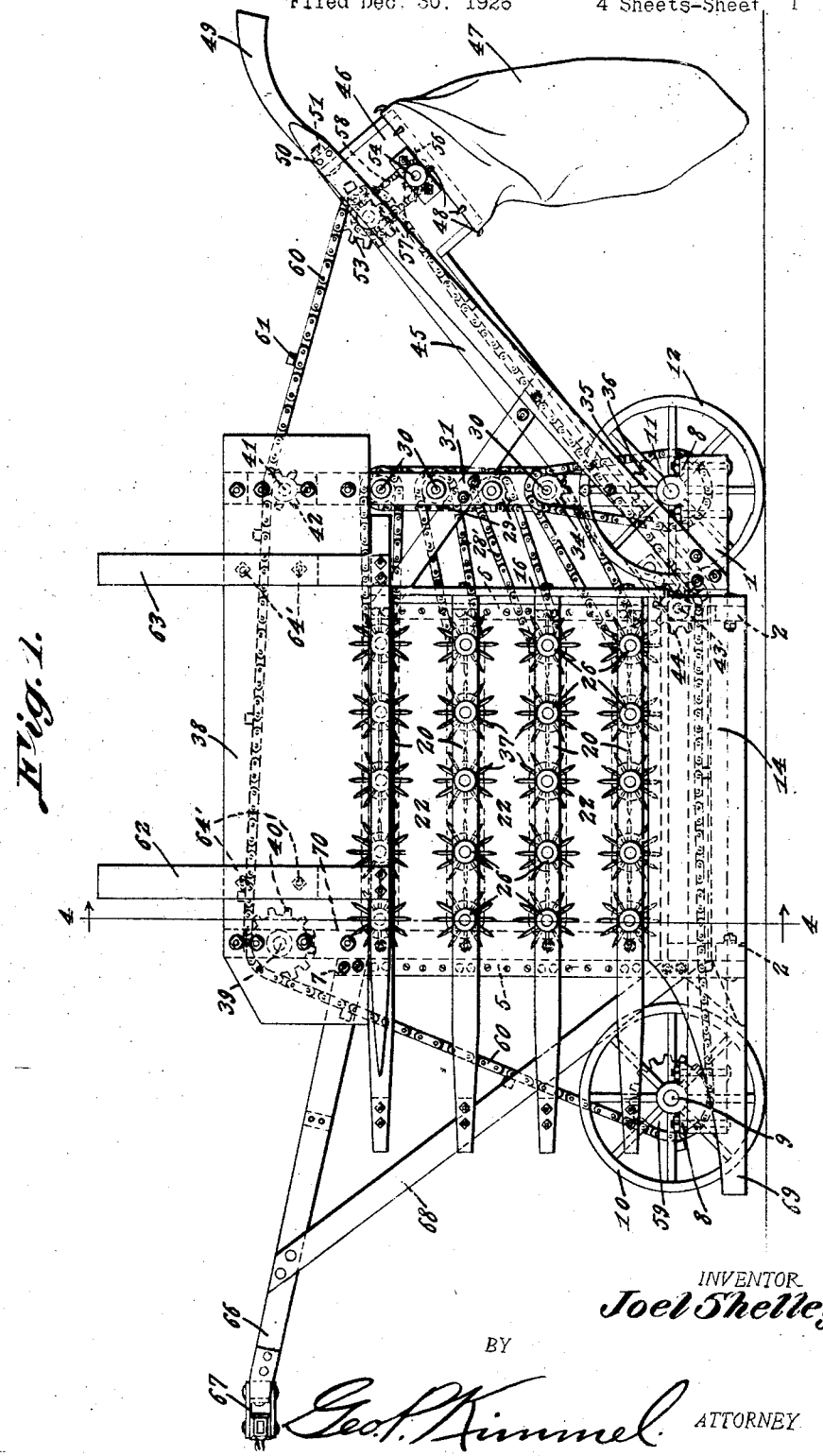
INVENTOR
Joel Shelley,
BY
Geo. F. Kimmel  ATTORNEY

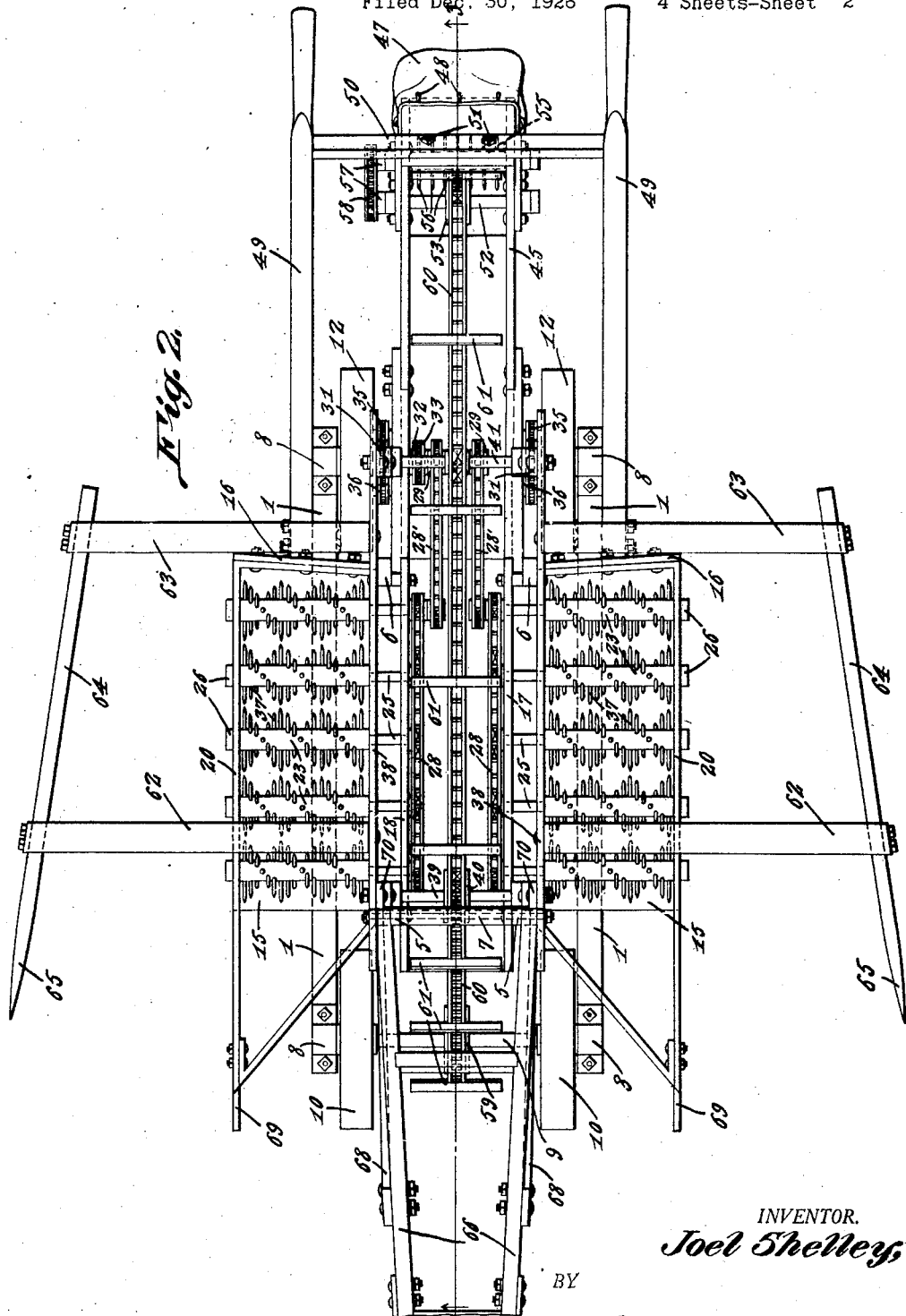

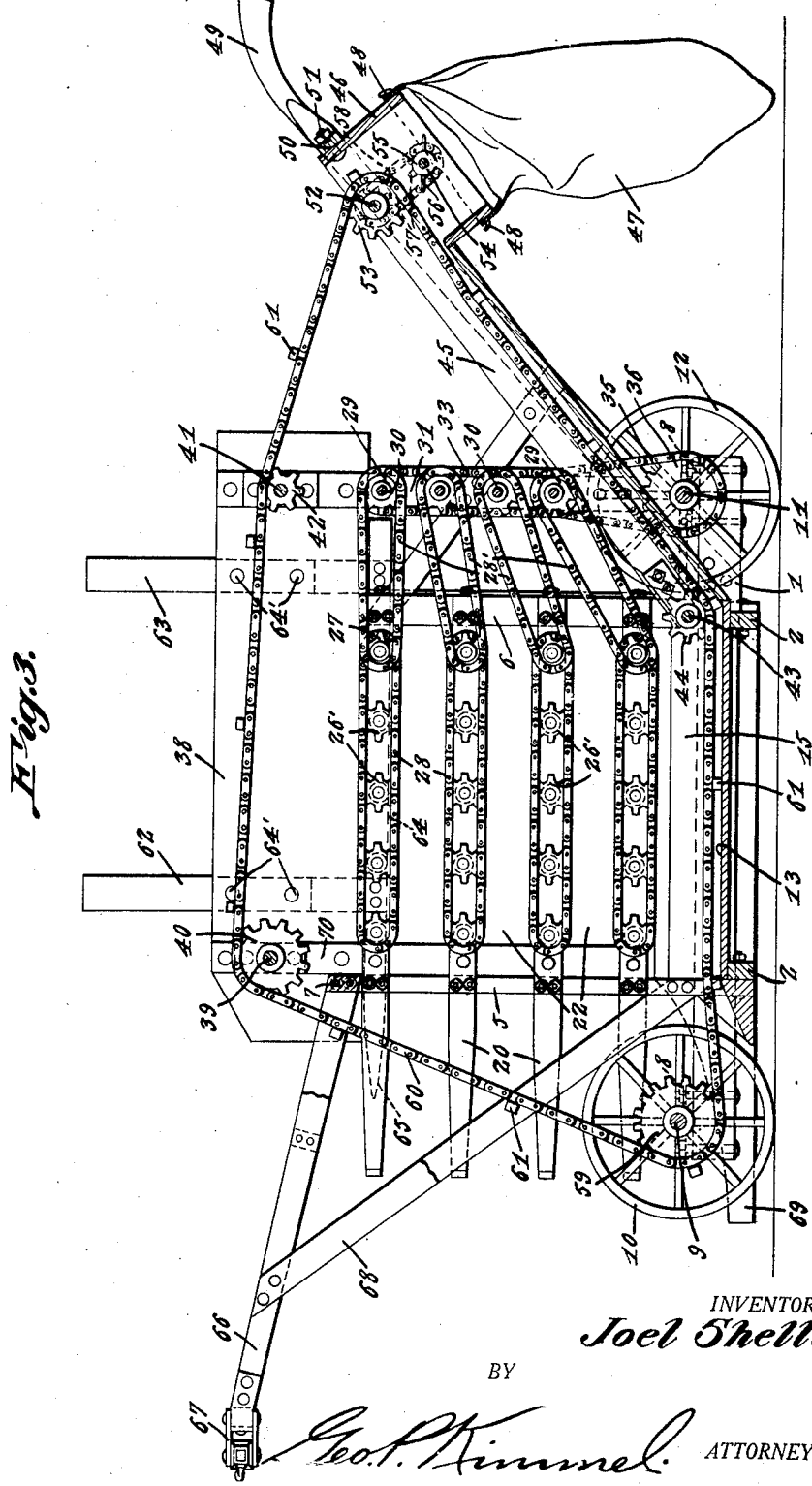

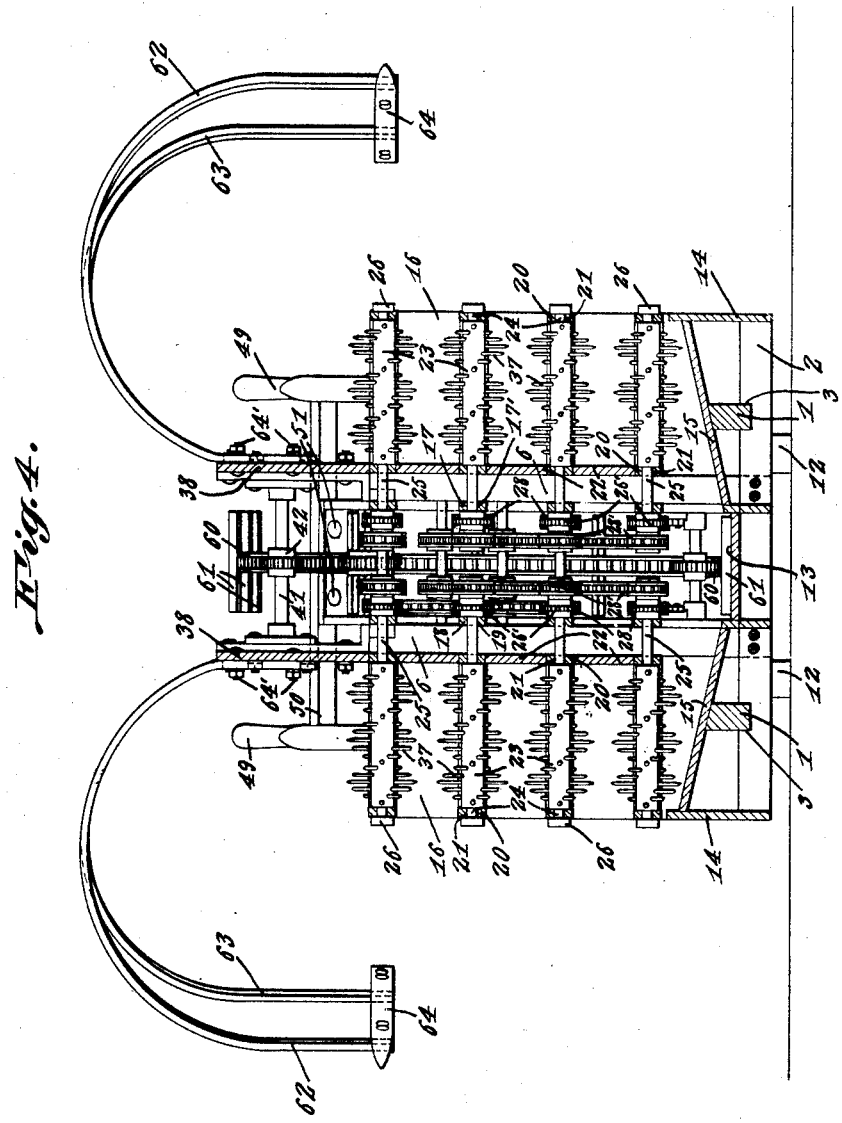

Patented May 28, 1929.

1,715,309

UNITED STATES PATENT OFFICE.

JOEL SHELLEY, OF HEADLAND, ALABAMA.

COTTON PICKER.

Application filed December 30, 1926. Serial No. 157,976.

This invention relates to a cotton picker or harvester, and has for its object to provide, a harvesting machine of such class, in a manner as hereinafter set forth, for simultaneously picking or harvesting cotton from the opposed sides of a pair of rows of cotton plants when the machine travels between such rows, as well as further for conveying the harvested cotton to a receptacle carried by and during the travel of the machine.

Further objects of the invention are to provide, in a manner as hereinafter set forth, a cotton harvesting machine including picker elements for picking cotton from the opposed sides of a pair of rows of cotton plants during the travel of the machine between such rows, and further for retaining the limbs or stems of the plants of the rows in the path of the picker elements when the machine is travelling between the rows, or in other words gauging irregular rows of plants in a manner whereby the stalks of the plants will be held towards the machine so that the limbs will be positioned in the path of travel of the picker elements to provide for efficient picking action with respect to the plants.

A further object of the invention is to provide, in a manner as hereinafter set forth, a cotton harvesting machine including pickers disposed in a manner to pick the cotton from the bottom to the top of the plants of the rows between which the machine travels.

A further object of the invention is to provide, in a manner as hereinafter set forth a cotton harvesting or picking machine for efficiently picking, by pulling action, cotton from the open burrs and without injury to the green bolls of the plants of the rows between which the machine travels when performing its picking function.

Further objects of the invention are to provide, in a manner as hereinafter set forth, a cotton picking or harvesting machine, which is simple in its construction and arrangement, strong, durable, compact, thoroughly efficient in its use, expeditiously harvesting cotton at a material saving in expense over the expense required by hand picking, capable of being drawn between the rows by horse power or by tractor, readily assembled, and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a cotton picker in accordance with this invention.

Figure 2 is a top plan view thereof.

Figure 3 a vertical section on line 3—3 Figure 2.

Figure 4 a transverse section on line 4—4 Figure 1.

The machine includes a body portion in the form of a wheeled carriage including a pair of spaced longitudinal frame members 1 and front and rear spaced transverse frame members 2. The members 1 are secured upon the members 2 and project forwardly and rearwardly with respect to the latter. Each of the members 1 has an inwardly bevelled top edge. The members 2 are mortised as at 3 to receive members 1. The frame further includes a front and rear pair of standards 5, 6 respectively, which are secured to the members 2. The standards of each pair oppose each other and are arranged in spaced relation. The standards 5 are of greater height than the standards 6 and are connected together at their upper ends by a cross piece 7. The standards 5 oppose the standards 6.

Each of the members 1, at each end thereof, has secured upon the top thereof a bearing 8. The bearings 8 on the forward ends of the members 1 have journaled therein the front axle 9 carrying a pair of supporting wheels 10, and the bearings 8 at the rear ends of the members 1 have journaled therein the rear axle 11 carrying a pair of supporting wheels 12. The wheels 10 and 12 are arranged between the members 1 and are of a diameter to support the machine frame in close proximity to the ground.

Positioned centrally of the carriage is a conveyor trough 13 which is secured to the members 2 and standards 5, 6. The trough 13 is disposed longitudinally of the machine frame, and is arranged at the lower ends of the standards 5, 6.

Secured to the frame members 2, at each side of the machine frame is a vertically disposed side board or plate 14, which extends forwardly with respect to the forward frame member 2. The side boards 14 extend above the frame members 2. Mounted on each longitudinal member 1, is an inclined directing plate 15 for the harvested cotton, and which causes the cotton when free of the picker elements to discharge into the trough 13. The plates 15 extend from the side boards 14 to the trough 13 and are disposed lengthwise of the machine frame. Secured to the rear members 2 and against the rear ends of the side boards 14, as well as being of the same height, as the height of the standards 6, is a pair of spaced vertically disposed, rearwardly inclined, combined wall forming, directing and supporting elements 16 which are of materially greater height than the side boards 14.

Secured to and positioned between the standards of both pairs are two opposed sets of longitudinally extending spaced journal bars. The bars of one set are indicated at 17 and each of which is formed with spaced openings 17'. The bars of the other set are indicated at 18, and each of which is formed with a series of spaced openings 19. The openings of opposing bars are arranged in alinement. The bars 17 and 18 also provide shaft supports and are secured to the inner faces of the standards 5, 6.

The machine includes two groups of superposed, spaced sets of picker elements. Each group is positioned at one side of and above the trough 13, as well as over and spaced from a directing plate. The number of sets of a group corresponds to the number of journal bars of a group. Associated with each set of picker elements is a stationary, horizontally disposed, sectional carrier therefor. Each carrier is indicated at 20, and is in the form of a laterally disposed frame secured at its rear end to an element 16. Each carrier is disposed lengthwise of the machine frame and has its forward end extended from a front standard 5 at an inclination, and in a manner whereby the outer side of the carrier will be of greater length than the inner side thereof. The carriers are arranged in sets, each set corresponding in number to the number of sets of picker elements in a group. One set of carriers is oppositely disposed with respect to the other. The carriers of each set are positioned in spaced, superposed relation. The inner side of the carriers of each set are secured to the outer side of a front and rear standard and in alinement with but spaced from a set of journal bars. The sides of each of the carriers are formed with alining openings 21 which also aline with the openings in the journal bars.

Secured to the standards 5, 6 and arranged between the inner sides of the carriers 20 are wall forming members 22.

Each picker element of a set thereof consists of a cylindrical body portion 23 positioned between the sides of a carrier and having a spindle at each end. The outer end of the spindle 24 carries a head 26. The spindle 24 is journaled in an opening 21 formed in the outer side of a carrier 20 and the cap or head piece 26 abuts against the outer face of such side. The spindle 25 is journaled in an opening 21 formed in the inner side of the carrier 20 and also extends through an alining opening formed in a journal bar. The inner end of each spindle 25 carries a sprocket pinion 26'. The rear spindle 25 of each set also carries a sprocket pinion 27. Engaging with the sprocket pinions 26' of each set is an endless sprocket chain 28 which provides for the synchronous rotation of the picker elements of a set. Associated with each sprocket pinion 27 is a driving chain 28' therefor. Each chain 28' is driven from a sprocket pinion 29 carried by a shaft 30 journaled in a pair of spaced uprights 31. Each shaft 30 is provided with a pair of pinions 29 arranged in spaced relation. Each shaft 30 is furthermore provided with a sprocket pinion 32 and common thereto for the purpose of synchronously driving the shafts 30 is a sprocket chain 33. The shafts 30 are arranged in superposed, spaced alinement and each end of the lowermost shaft 30 exteriorly of an upright, carries a sprocket pinion 34 which is driven from a chain 35, operated from a sprocket wheel 36 carried by the axle 11.

Each picker element further includes a series of radially disposed picker fingers 37 arranged in spaced relation and extended throughout the body portion 23 of the element. Preferably the picker fingers 37 are of different lengths and disposed in a spiral row with respect to the periphery of the body portion 23.

Resting upon the inner edge of the upper side of the upper carrier 20, of each group of carriers, is a vertically extending and longitudinally disposed guard member 38, which is anchored in position, and is of a length to project forwardly and rearwardly with respect to the standards 5, 6. Supported from and arranged between the guard members 38 near the forward ends thereof, is a shaft 39, provided centrally thereof with a sprocket gear 40, and arranged between, as well as supported from the guard members 38, in proximity to the rear thereof, is a shaft 41, provided centrally thereof with a sprocket pinion 42. Arranged between the lower ends of the standards 6, and positioned above, as well as being spaced from the bottom of the trough 13, and further supported from the standards 6, is a shaft 43, carrying a sprocket pinion 44.

The trough 13, opens at its rear end into an upwardly extending and rearwardly inclined conducting chute 45 having its upper end provided with a discharge spout 46, to which a removable collector 47 is detachably connected, as at 48. Extended rearwardly from the machine frame is a pair of upwardly inclined handle bars 49 having arranged therebetween and connected therewith a brace 50 which is also secured to the upper end of the chute 45, as at 51. Journaled in the upper end of the chute 45 is a transversely extending shaft 52 provided centrally thereof with a sprocket pinion 53, and journaled in the spout 46 is a transversely extending shaft 54 provided with a pick-up member 55, consisting of a cylindrical body portion provided with pick-up fingers 56. The shaft 52, as well as the shaft 54, on one of the ends thereof carries a sprocket pinion 57 and which are connected together by a drive chain 58 whereby the shaft 54 is driven from the shaft 52.

The axle 9, centrally thereof is provided with a sprocket gear 59 employed to operate a conveyor 60 in the form of an endless sprocket chain and which has its outer side provided with transversely extending, spaced conveyor members 61. The conveyor 60 travels over the sprocket gear 40, sprocket pinion 41, pinion 53 and pinion 44 and further travels through the trough 13 in a manner whereby the conveyor members 60 will conduct the harvested cotton or rather convey the harvested cotton from the front to the rear of the trough 13 and up the chute 45 where it will fall into the spout 46 and be acted upon by the pick-up member, which also acts as a means for cleaning the cotton from off the conveyor 60, and the pick-up member will act to throw the cotton into the collector or receptacle 47, and after the latter has been filled it is removed and an empty collector 47 attached to the spout 46.

The sets of picker elements are driven from the rear axle of the machine and the conveyor driven from the forward axle of the machine.

The machine includes a pair of oppositely disposed gauge devices, which overlap the plants, ride against the stalks thereof, and act as a means to retain the plants in a direction towards the picker elements so that the sides of the plants, from which the cotton is to be picked will be engaged by the picker elements. Each of the gauge devices are of the same construction, and the description of one will apply to the other. Each gauge device is anchored to a guard member 38 and projects laterally therefrom. Each gauge device comprises a pair of curved resilient spaced arms 62, 63 of arch shaped form. but the arch formed by the arm 62 is of greater width than the arch formed by the arm 63. The inner end terminal portion of each arm is secured to the outer face of the guard member 38 by the holdfast devices 64'. The outer terminal portion of each arm depends below the inner terminal portion thereof and the outer terminal portions of said arms are connected together by a holding bar 64 which inclines outwardly from the rear to the forward end thereof. The forward terminal portion of the holding bar 64 is tapered, as at 65. The arm 62 is arranged in proximity to and rearwardly of the standards 5, and the arm 63 is arranged rearwardly of and in proximity to the standards 6.

Connected to and projecting forwardly from the standard 5, as well as at an upward inclination, is a spaced pair of tongues 66 having a hitch 67 at the forward ends thereof. The tongues 66 are braced by inclined brace bars 68 which are secured to said tongues and to the standards 5 in proximity to the lower ends thereof.

The side boards 14 extend forwardly as at 69, and project beyond the forward wheels 10 and provide what may be termed shields or deflectors.

The uprights 31 are secured to the sides of the chute and also to the inner faces of the guard members. The uprights 70 are also secured to the inner faces of the guard members and to the carriers 20.

The carriers 20 also provide what may be termed guides for the limbs of the plants causing them to pass between the sets of picker elements.

The machine operates between two rows of plants and will pick the cotton from the right side of one row and the left side of the other row. The picker elements will pull the cotton from the open burrs, without injuring the green bolls as these latter will slip on through between the sets of picker elements. The harvested cotton will eventually reach the plates 15 and pass into the trough 13. From there it will be conducted up the chute and discharged into a sack. The arrangement of the carriers, that is projecting forwardly from the sets of picker elements, will straighten the limbs and prevent choking. The straightening of the limbs will be in advance of the action of picking by the picker elements. The gauge devices will keep the cotton from leaning away from the pickers and will slide against the stalks and hold them in a straight position. The limbs of the plant will slip through between the sets of picker elements and as these latter are revolving they will pull the cotton from the burrs and each picker element will unload the other until the harvested cotton reaches the plate 15. As the machine is built low to the ground it will pick the cotton from the lower portion of the plants. Also it will pick the cotton from the upper portion of the plants, due to the fact that the machine is of the necessary height to perform such function.

It is thought the many advantages of a cotton picking or harvesting machine, in accordance with this invention, can be readily understood, and although the preferred embodiment of the invention is as illustrated and described, yet it is to be understood that changes in the details of construction can be had which will fall within the scope of the invention as claimed.

What I claim is:

1. A cotton picking machine comprising a pair of oppositely disposed spaced sets of superposed carriers, a journal bar opposing and spaced from the inner side of each carrier, a set of spaced picker elements positioned in each carrier and including an outer and an inner spindle, said outer spindle journaled in the carrier and said inner spindle journaled in the carrier and a journal bar and further extending inwardly from the latter, a wheeled carriage supporting the carriers and bars, means operated from said carriage and engaging with the inner spindles for synchronously revolving said sets of picker elements, a conveyor trough positioned between sets of carriers and arranged below the lowermost carriers, directing means positioned below the lowermost carriers and extending toward said trough, a conducting chute extending upwardly and rearwardly from said trough and having a discharge spout at its upper end, and a conveyor mechanism operating through said trough and chute and driven from said carriage.

2. A cotton picking machine comprising a pair of oppositely disposed spaced groups superposed, fixed, horizontally arranged, spaced carriers each in the form of a frame, a fixed journal bar opposing and spaced from the inner side of each carrier, a set of spaced, independent, parallel, rotatable picker elements positioned in and transversely of each carrier and each including an outer and an inner spindle, said outer spindle journaled in the outer side of a carrier and said inner spindle journaled in the inner side of the carrier and in the journal bar and further extending inwardly from the latter, a wheeled carriage supporting the carriers and bars, means operated from said carriage and engaging the said inner spindles for simultaneously rotating the picker elements of each of said sets.

3. A cotton picking machine comprising a pair of oppositely disposed spaced groups of superposed, fixed, horizontally arranged, spaced carriers each in the form of a frame, a fixed journal bar opposing and spaced from the inner side of each carrier, a set of spaced, independent, parallel, rotatable picker elements positioned in and transversely of each carrier and each including an outer and an inner spindle, said outer spindle journaled in the outer side of a carrier and said inner spindle journaled in the inner side of the carrier and in the journal bar and further extending inwardly from the latter, a wheeled carriage supporting the carriers and bars, means operated from said carriage and engaging the said inner spindles for simultaneously rotating the picker elements of each of said sets, and each of said carriers having the forward end of its outer side inclining outwardly and forwardly with respect to the inner side of the carrier.

4. A cotton picking machine comprising a pair of oppositely disposed spaced groups of superposed, fixed, horizontally arranged, spaced carriers each in the form of a frame, a fixed journal bar opposing and spaced from the inner side of each carrier, a set of spaced, independent, parallel, rotatable picker elements positioned in and transversely of each carrier and each including an outer and an inner spindle, said outer spindle journaled in the outer side of a carrier and said inner spindle journaled in the inner side of the carrier and in the journal bar and further extending inwardly from the latter, a wheeled carriage supporting the carriers and bars, means operated from said carriage and engaging the said inner spindles for simultaneously rotating the picker elements of each of said sets, and oppositely disposed outwardly inclined resilient gauge devices projecting laterally from the top of said carriage and overhanging and spaced laterally from the upper carriers of said sets.

5. A cotton picking machine comprising a pair of oppositely disposed spaced groups of superposed spaced carriers, a set of spaced rotatable, parallel picker elements mounted in each of said carriers, a wheeled carriage for supporting said carriers, means operated from said carriage for simultaneously rotating the picker elements of each of said sets, a conveyor trough positioned below and between said sets of carriers, a conducting chute extending upwardly from said trough at a rearward inclination and provided with a discharge spout at its top, a conveyor mechanism operated from said carriers and traveling through said trough and spout, spaced guards secured to the uppermost carriers and supporting idler sprockets for the conveyor mechanism, oppositely disposed resilient guard devices projecting laterally from said guards and overhanging and spaced laterally from said sets of carriers, oppositely disposed directing means arranged below said sets of carriers and extending towards said trough, and a pick-up element rotatably supported within said discharge spout.

6. A cotton picking machine comprising a pair of oppositely disposed spaced groups of superposed spaced carriers each in the form of a frame, wall forming members positioned between the inner sides of the carriers of each set, a set of spaced rotatable picker elements mounted in each of said carriers, a wheeled carriage for supporting said carriers, upstanding spaced guards secured to the uppermost carriers, means operated from said carriage and operatively engaging with the inner ends of said elements for simultaneously rotating the elements of each of said sets, a conveyor trough positioned below and between said sets of carriers, a conducting chute extending upwardly from the rear end of said trough and provided with a discharge spout, a conveyor mechanism operated from said carriage, travelling through said trough and spout and between said guards, idler sprockets supported from said guards for said conveyor mechanism, and a pick-up element rotatably supported within said discharge spout.

7. A cotton picking machine comprising a pair of oppositely disposed spaced groups of superposed spaced carriers each in the form of a frame, wall forming members positioned between the inner sides of the carriers of each set, a set of spaced rotatable picker elements mounted in each of said carriers, a wheeled carriage for supporting said carriers, upstanding spaced guards secured to the uppermost carriers, means operated from said carriage and operatively engaging with the inner ends of said elements for simultaneously rotating the elements of each of said sets, a conveyor trough positioned below and between said sets of carriers, a conducting chute extending upwardly from the rear end of said trough and provided with a discharge spout, a conveyor mechanism operated from said carriage, travelling through said trough and spout and between said guards, idler sprockets supported from said guards for said conveyor mechanism, a pick-up element rotatably supported within said discharge spout, and directing means supported from the carriage, arranged below the lowermost carriers and extending toward said trough at an inclination.

8. A cotton picking machine comprising a pair of oppositely disposed spaced groups of superposed spaced carriers each in the form of a frame, wall forming members positioned between the inner sides of the carriers of each set, of spaced rotatable picker elements mounted in each of said carriers, a wheel carriage for supporting said carriers, upstanding spaced guards secured to the uppermost carriers, means operated from said carriage and operatively engaging with inner ends of said elements for simultaneously rotating the elements of each of said sets, a conveyor trough positioned below and between said sets of carriers, a conducting chute extending upwardly from the rear end of said trough and provided with a discharge spout, a conveyor mechanism operated from said carriage, travelling through said trough and spout and between said guards, idler sprockets supported from said guards for said conveyor mechanism, a pick-up element rotatably supported within said discharge spout, directing means supported from the carriage, arranged below the lowermost carriers and extending toward said trough at an inclination, and oppositely disposed resilient guard devices projecting laterally from said guards and overhanging and spaced laterally from said carriers and further disposed at an outward inclination with respect to the latter.

In testimony whereof I, affix my signature hereto.

JOEL SHELLEY.